3,577,234
BRAZING ALLOYS
John D. Boughton, Philip M. Roberts, and Meczyslaw Herman Sloboda, London, England, assignors to Johnson, Matthey & Co. Limited, London, England
No Drawing. Filed Aug. 4, 1967, Ser. No. 658,350
Claims priority, application Great Britain, Aug. 18, 1966, 37,053/66
Int. Cl. C22c 9/06; B32b 15/20
U.S. Cl. 75—159
4 Claims

ABSTRACT OF THE DISCLOSURE

This invention relates to a brazing alloy suitable for the fluxless brazing of steels (unalloyed and alloy steels including stainless steel). The brazing alloy consists essentially of 0.5–10% nickel, 0.01–0.05% boron and the balance copper.

---

This invention relates to brazing alloys and more particularly to brazing alloys suitable for use in the fluxless brazing of steel. Throughout this specification, the term steel is used generically to include both unalloyed and alloy steels, including stainless steel.

When steel is brazed in air, it is usually necessary to employ a fusible flux whose main function is to maintain the surface of both the workpiece and the brazing alloy free from oxide films which might inhibit wetting and bond formation. The use of fluxes can be obviated by carrying out the brazing operation in a neutral or reducing atmosphere, which usually involves the use of a specially designed brazing furnace.

If a reducing furnace atmosphere is satisfactorily to perform its function, it must not contain more than a certain proportion of moisture, the critical moisture concentration (usually measured in terms of the "dew point" of the gas) being determined in the first instance by the composition of the steel to be brazed. Since maintaining the required degree of purity of the furnace atmosphere may be a difficult and costly operation, one of the desirable properties of alloys suitable for fluxless brazing of steel is that they should not require a higher degree of purity of the furnace atmosphere than that demanded by the material of the workpiece.

An alloy which, according to our invention, possesses this property in addition to some other desirable characteristics comprises (apart from impurities) 0.5 to 50 wt. percent nickel, 0.01 to 1.0 wt. percent boron, and balance copper.

One alloy in accordance with this invention comprises, apart from impurities, 0.5 to 20 wt. percent nickel, 0.01 to 0.05 wt. percent boron and balance copper. Another alloy in accordance with this invention comprises, apart from impurities, 0.5 to 10 (and preferably 2.5 to 3.5) wt. percent nickel, 0.01 to 0.05 wt. percent boron and balance copper.

This invention also includes a method wherein the copper is melted under crushed graphite.

The impurities present in a brazing alloy within the ranges given above may comprise silicon 0.005 wt. percent maximum, zirconium 0.005 wt. percent maximum and manganese 0.005 wt. percent maximum.

Although brazing alloys consisting of copper and nickel have previously been proposed, we have now found that the inclusion of boron produces highly desirable effects in that boron improves the casting properties of the alloy, refines its grain structure, and improves its wetting characteristics.

A useful characteristic of the brazing alloy according to the invention is that while being capable of penetrating narrow (e.g. 0.001 inch wide) joint gaps it also can bridge wide (up to 0.020 inch) gaps; this property is particularly useful in brazing mass-produced parts when the dimensional tolerances cannot be closely controlled.

Another feature of the brazing alloy according to this invention is that joints made with this alloy in stainless steel are not subject to "crevice corrosion"; this is a special type of galvanic corrosion which in some cases may lead to a rapid failure of the joint owing to the dissolution of a thin steel layer at the brazing alloy/steel interface.

One method by which the alloy in accordance with the invention may be made will now be described by way of example.

A 60 lb. melt of copper was prepared in a high frequency electric furnace. During the preparation of the melt the copper was melted under crushed graphite and stirred using a stirrer made from a carbon rod. A master boron/nickel alloy in solid form and containing 11.5 to 12 wt. percent boron was added to the copper melt and the molten alloy was, thereafter, cast into ingots at a temperature of 1175° C. The alloy thus produced had the following composition:

Nominally 2.95 wt. percent nickel
Nominally 0.05 boron
Balance copper

What we claim is:
1. A brazing alloy consisting essentially of, apart from impurities, 0.5 to 10 wt. percent nickel, 0.01 to 0.05 wt. percent boron and balance copper.
2. A brazing alloy according to claim 1 including 2.5 to 3.5 wt. percent nickel.
3. A brazing alloy according to claim 2 including 2.5 to 3.0 wt. percent nickel.
4. A brazing alloy according to claim 1 wherein the impurities comprise up to 0.005 wt. percent silicon, up to 0.005 wt. percent zirconium and up to 0.005 wt. percent manganese.

References Cited

UNITED STATES PATENTS

| | | | |
|---|---|---|---|
| 570,014 | 10/1896 | Hall | 75—153 |
| 2,755,182 | 7/1956 | Cape | 75—159 |
| 2,768,893 | 10/1956 | Bredzs | 75—159 |
| 2,891,860 | 6/1959 | Woolard | 75—159 |
| 2,946,678 | 7/1960 | La Rou | 75—159X |
| 3,172,762 | 3/1965 | Wilson | 75—153 |
| 3,403,997 | 10/1968 | Badia | 75—76 |

OTHER REFERENCES

Hansen, Constitution of Binary Alloys, 1958, pp. 249 and 602.

CHARLES N. LOVELL, Primary Examiner